Sept. 3, 1968  G. J. REISCH  3,399,911
HUB AND SHAFT COUPLING
Original Filed Sept. 10, 1963  3 Sheets-Sheet 2
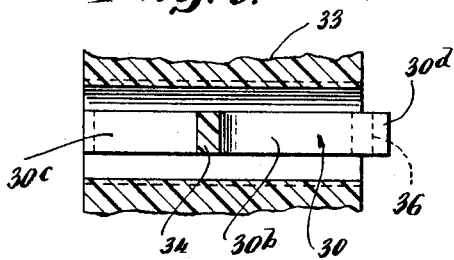
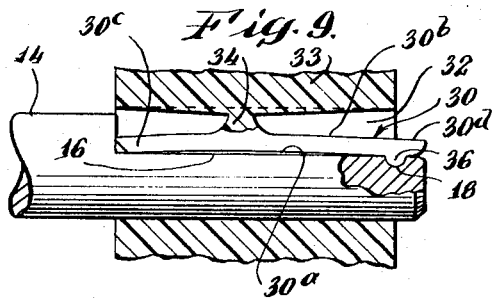
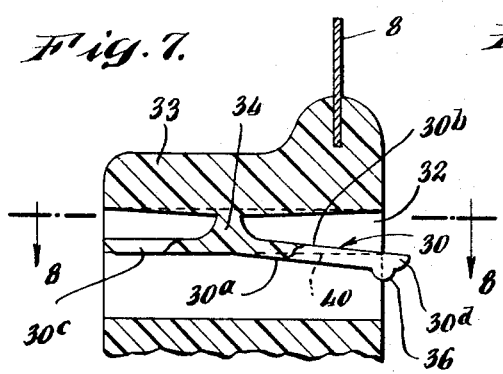
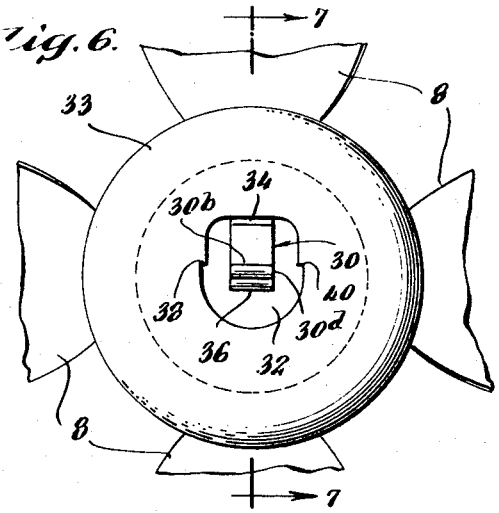
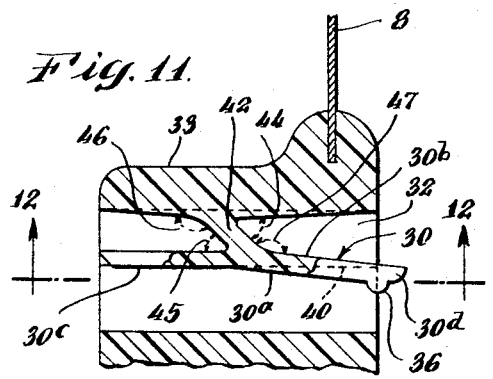
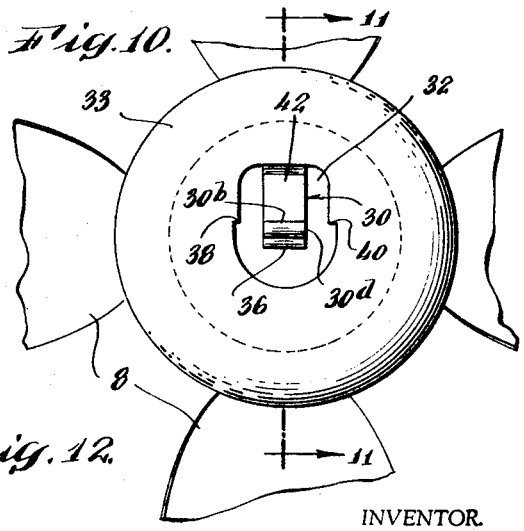
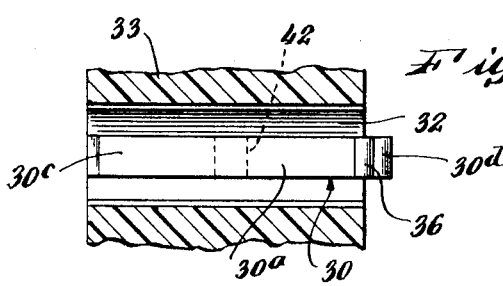
INVENTOR.
George J. Reisch
BY
*Laurence R. Lempore*
ATTORNEY

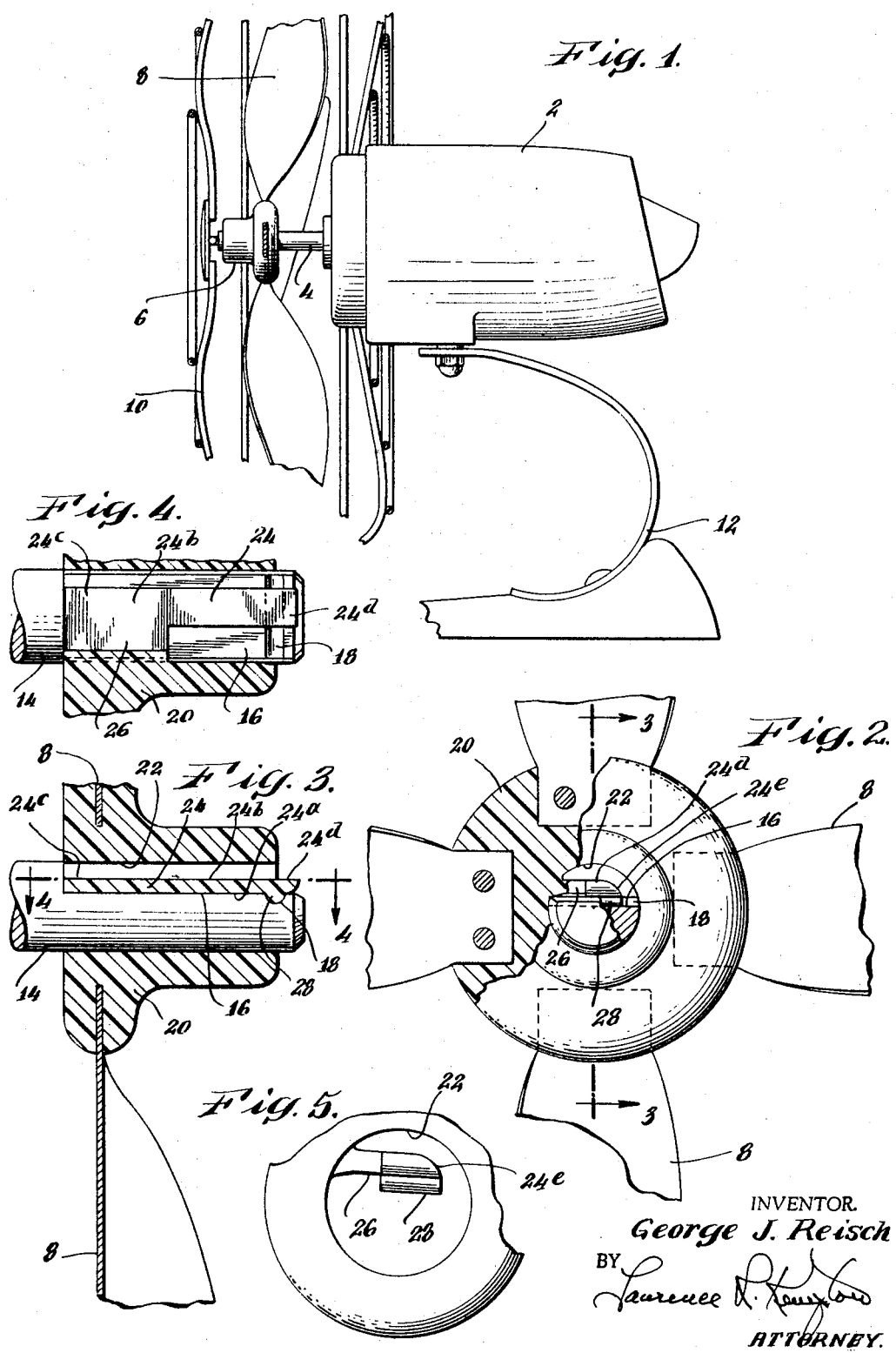

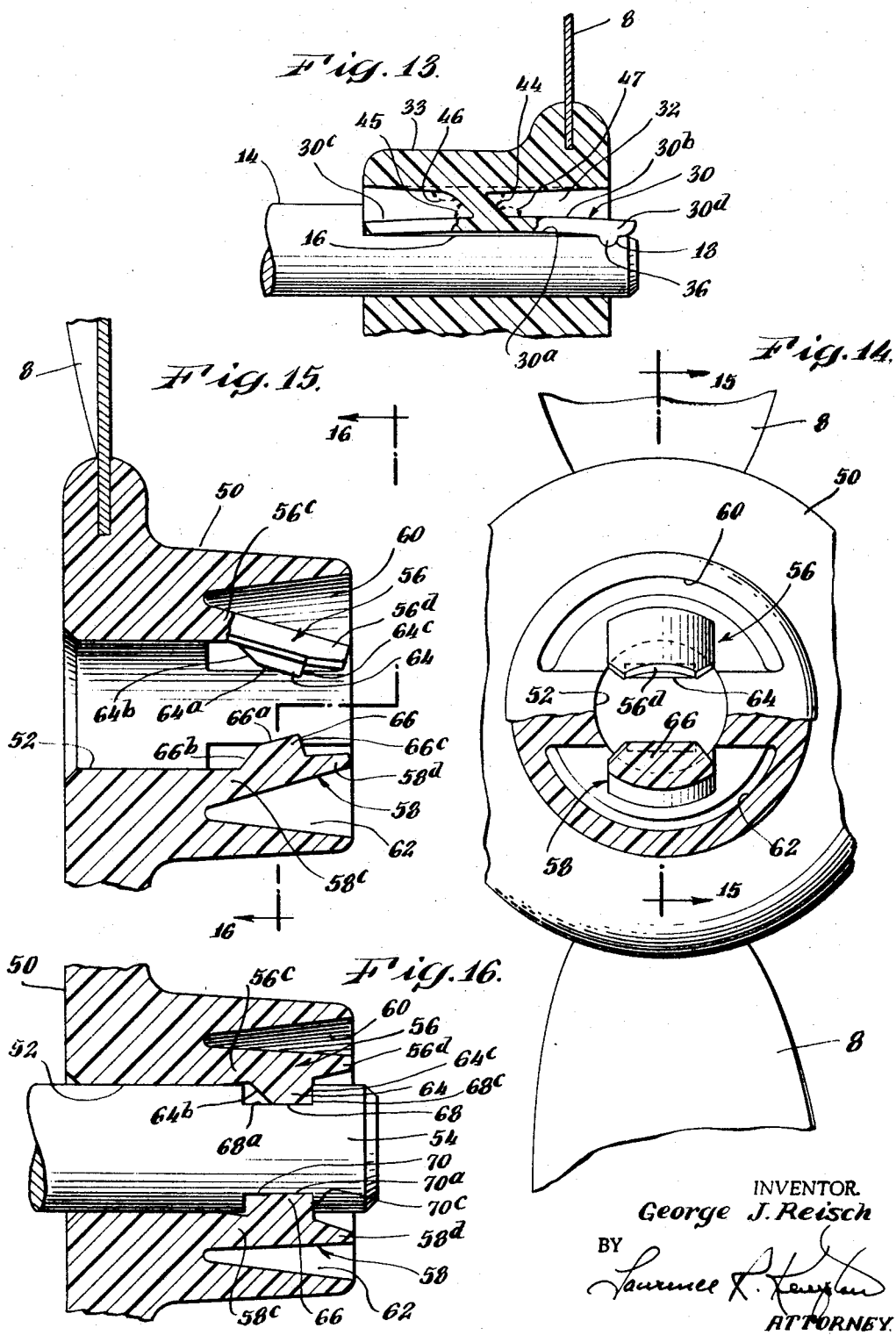

United States Patent Office 3,399,911
Patented Sept. 3, 1968

3,399,911
HUB AND SHAFT COUPLING
George J. Reisch, Shelton, Conn., assignor to General Electric Company, a corporation of New York
Original application Sept. 10, 1963, Ser. No. 307,888, now Patent No. 3,264,016, dated Aug. 2, 1966. Divided and this application Mar. 21, 1966, Ser. No. 554,222
2 Claims. (Cl. 287—53)

ABSTRACT OF THE DISCLOSURE

A hub and shaft coupling for use with a molded hub comprising a flexible latch integral with and positioned within the bore of said hub and containing a rib-like projection which engages a groove or recess formed on a flattened exterior surface of the shaft. The latch is self-biased so that it positively engages the shaft at all times and thereby transmits torque to the hub assembly. The self-biasing of the latch is obtained by urging its free ends radially inwardly with respect to a portion connected to the internal wall of the hub bore.

This invention relates to an improved arrangement for coupling a hub to a shaft and more particularly to a molded hub having an integral latch for attaching the hub to the shaft. This is a division of my copending application Ser. No. 307,888, filed Sept. 10, 1963, and now U.S. Patent No. 3,264,016.

Securing a hub to a shaft is one of the more basic manufacturing operations, and hence any improvements in the coupling of these two components are valuable contributions to the art. The improved arrangements of this invention, although not so limited, are particularly suitable for use in the manufacture of hubs carrying fan blades or blower wheels. In addition to being widely used as separate appliances, fans or similar rotary members are, of course, also used in many other products such as heaters, hair dryers, and air conditions, to name just a few. In view of the large volume production of such items, any reductions in the number of parts required or improvements in the assembly procedure resulting in lower cost, can be highly significant.

It is a primary object of this invention to provide an improved low cost hub and shaft coupling arrangement having a minimum number of parts and having simplified assembly and disassembly operations.

It is another object of this invention to provide a unique molded hub assembly including an integral self-latching means by which the hub is firmly attached to a shaft.

It is a further object of this invention to provide an improved low cost hub and shaft coupling which can be quickly assembled by hand without the assistance of tools.

Yet another object of this invention is to provide a unique and simplified hub and shaft coupling arrangement in which a force in the direction to withdraw the hub from the shaft will cause the hub to be more firmly attached to the shaft.

Briefly stated, the improved coupling arrangement of this invention requires a shaft having a groove or recess formed in its exterior surface between the ends of the shaft and usually adjacent one end of the shaft. A molded hub, such as a type suitable for carrying fan blades, is provided having a bore for receiving the shaft and including a flexible latch having a portion integrally formed with an internal wall of the hub bore and a portion which is radially movable within the hub. The movable portion of the latch is formed with a radial extending lock portion adapted to fit within the groove in the shaft. In molding the hub and latch, the latch is self-biased so that the lock portion is urged radially inward beyond the bore diameter. Hence, when the hub is assembled to the shaft the lock portion is forced radially outward by the shaft until the lock portion is aligned with the groove, and it then snaps radially inward into the groove thereby axially positioning the shaft relative to the hub. Such an arrangement will also resist rotary movement between the hub and the shaft and thus transmit torque between the two components. Additional molded configurations can be incorporated into the hub bore and latch to transmit forces for higher torque applications.

Further features, objects and advantages will become apparent with reference to the following description and drawings wherein:

FIG. 1 is a side partially cut away view of a portable fan incorporating the shaft and hub coupling arrangement of this invention;

FIGS. 2–5 illustrate one embodiment of this invention with FIG. 2 being an end view, partially sectionalized, of the fan hub and shaft assembly;

FIG. 3 is a sectional view on line 3—3 of FIG. 2;

FIG. 4 is a sectional view on line 4—4 of FIG. 3; and

FIG. 5 is an enlarged end view of the hub bore and latch assembly;

FIGS. 6–9 illustrate another embodiment of the invention with FIG. 6 being an end view of the hub assembly;

FIG. 7 is a side sectional view on line 7—7 of FIG. 6;

FIG. 8 is a sectional view on line 8—8 of FIG. 7; and

FIG. 9 is a side elevational view, partially sectionalized, of the assembled hub and shaft;

FIGS. 10–13 illustrate another embodiment of this invention very similar to the embodiment of FIGS. 6–9;

FIG. 10 is an end view of the hub assembly;

FIG. 11 is a sectional view of the hub assembly on line 11—11 of FIG. 10;

FIG. 12 is a sectional view of the hub assembly on line 12—12 of FIG. 11; and

FIG. 13 is a side elevational view, partially sectionalised, of the shaft and hub assembly;

FIGS. 14–16 illustrates a final embodiment of the invention with FIG. 14 showing an end view, partially sectionalized, of the hub assembly;

FIG. 15 is a side sectional view on line 15—15 of FIG. 14; and

FIG. 16 is a side elevational view, partially sectionalized, of the hub and shaft assembly;

As previously mentioned, the unique hub and shaft assembly of this invention, while being suited for a wide variety of applications, is particularly useful in mass produced items such as electric fans or similar products. Hence, by way of example, there is shown in FIG. 1 an electric fan including a motor within housing 2, an output shaft 4, a fan blade hub 6 carrying a plurality of blade elements 8, a fan guard 10, and a suitable supporting structure 12. Since the invention relates to the shaft and hub coupling arrangement, further details of the remainder of the fan will not be given. The hub 6 and shaft 4 shown in FIG. 1 are representative of the exterior views of the various embodiments of the invention which will be hereinafter described.

In the embodiment of FIGS. 2–5 there is shown a shaft 14 having a circular cross-section with an elongated recess or chordal segment removed from one end of the shaft leaving an elongated, rectangular, flat exterior surface 16 on one side of the shaft end. A groove 18 having a semi-circular cross-section or other desirable configuration is formed in the flat surface 16 closely adjacent the shaft end; preferably, the groove extends transversely or in substantially perpendicular relation to the shaft axis.

The other component of the coupling is the hub 20 shown having molded in or mechanically fastened blades 8 and having an internal bore 22 adapted to snugly receive the shaft 14. In accordance with the invention, the hub 20 is provided with a latch member or element 24 integrally formed with an internal wall of the hub bore 22. As seen in the drawings, the latch 24 is an elongated member extending from one end of the hub bore to slightly beyond the other end of the bore. The latch has a rectangular shape with an axially extending radially inner flat surface 24a and an axially extending radially outer flat surface 24b. The end 24c of the latch 24 remote from the shaft end, is integrally joined with a side wall of the housing bore 22 by a connecting section 26. As can be seen from FIGS. 2 and 4, the connecting section 26 is merely an extension of one edge of the latch adjacent end 24c and the section extends throughout a predetermined axial length which in the arrangement shown is nearly half the length of the latch. Section 26 is positioned so that the end of the shaft fits within the space bounded by latch surface 24a and the adjacent walls of the bore 22. In this manner latch surface 24a engages the flat surface 16 on the end of shaft 14. Or stated differently, latch 24 fits within the elongated recess or chordal segment removed from the end of the shaft.

With the latch 24 connected at the side of one end to the hub bore in cantilever fashion, the opposite end 24d is free to flex in a radial direction. The edge 24e of the latch opposite from section 26 is also free to flex a lesser amount. In accordance with this invention, the latch 24 is self-biased so that the movable end 24d is normally urged radially inwardly with respect to the opposite end 24c of the latch 24 and so that the edge 24e of the latch is urged inwardly. Hence, when the shaft is inserted within the hub, the self-biasing nature of the latch urges the portion of inner flat surface 24a adjacent edge 24e tightly into engagement with shaft flat surface 16. This cooperation between the shaft 14 and latch 24 together with connecting section 26 serves to transmit torque between the shaft and the hub and prevents relative rotation between the two components. It should be noted that with the hub as shown in FIG. 5, the shaft 14 is preferably rotated in a clockwise direction so that the shaft drives against the connecting section 26.

To prevent the hub from being axially withdrawn from the shaft, the movable end 24d of latch 24 is formed with a radially inwardly extending rib-like projection 28 having a semicircular cross-section or other desirable configuration and adapted to fit within the shaft groove 18. In assembling the hub to the shaft, the rounded surface of the rib-like projection 18 engages the end of the shaft so that the movable end 24d of the latch is moved radially outwardly to permit the hub to be fully placed onto the shaft. It should be noted that the latch is positioned such that the bore is spaced radially outward from the outer surface 24b of the latch so that the latch end 24d can be moved outwardly a sufficient distance to accommodate the rib-like projection 28. When the projection is aligned with the groove 18 it snaps inwardly into the groove due to the self-biasing of the latch. Thus, with this interlocking of the rib and groove, the hub is effectively positioned on the latch without the use of set screws or any such similar additional parts or components. It should be noted that since the latch extends throughout the axial length of the hub and most of the latch surface 24a will always be in contact with flat surface 16 while the entire edge 24e will be under pressure with surface 16, the hub will not rock or tilt when an axial force is applied to the hub or blades attached thereto.

While the hub assembly is not limited to being made of a specific material, it is the use of plastics or similar moldable materials which makes this invention practical and worthwhile. With such materials the entire hub assembly, including the latch 24 and the lock portion 28, is molded into a single component. With the continual improvements being made in plastics, there are many low cost types available which have the necessary strength and heat withstanding characteristics. The one-piece plastic hub construction is particularly advantageous from the standpoint that the hub can be assembled to the shaft in a one step operation without the use of any tools. The disassembly operation is similarly very easy in that it is only necessary to lift the movable end 24d of the latch so that the lock portion 28 is free of groove 18, and then the hub can be easily withdrawn. Usually a screw driver or similar tool can be used to pry the latch end 24 outwardly.

Referring now to the embodiment of FIGS. 6–9, the coupling arrangement shown therein retains the basic concept of a molded hub assembly having an integral latch member but introduces several variations from that of the previous embodiment. As seen in FIG. 9, the shaft 14 is substantially the same as the shaft shown in FIG. 3 in that it has a flattened surface 16 on one end of the shaft and has a transversely extending semicircular groove 18 in the flat surface 16 adjacent the end of the shaft.

In accordance with this embodiment of the invention, however, the latch member 30 is connected at a location near its mid-section to the side wall of bore 32 of hub 33. More specifically, the latch 30 is connected by a radially extending connecting strut or section 34 which also serves as a fulcrum for the latch. With such an arrangement, moving one end 30d of the latch in one direction, say radially outwardly, will move the other end 30c of the latch radially inwardly.

The hub 33 is molded so that end 30d of the latch normally extends radially inwardly with respect to the connecting fulcrum 34 and with respect to the opposite latch end 30c, as clearly shown in FIG. 7. A rib-like lock portion 36 extends radially inwardly from end 30d of the latch. The lock portion is given a semicircular cross section which mates with the cross section of groove 18 formed in the end of shaft 14.

As can be seen from the drawings, latch 30 has an inner flat surface 30a and an outer flat surface 30b. The inner flat surface 30a and the opposing portions of the bore 32 define a space adapted to receive the flattened end of shaft 14. The distance between the inner flat surface 30a in the area adjacent the latch end 30c to the opposing wall of bore 32 is such that the shaft end can be inserted into the hub bore without appreciable interference. However, as the shaft is inserted further, the end of the shaft engages the inwardly extending latch end 30d causing it to be forced radially outwardly within the space between the latch end and the outwardly adjacent wall of bore 32. As the shaft end engages lock portion 36, latch end 30d will naturally be forced further radially outwardly. When the lock portion 36 is aligned with shaft groove 18, latch end 30d will snap inwardly into locking position. Thus, the self-biasing of the latch will hold the lock portion in position to prevent axial movement of the shaft relative to the hub. Since the latch end 30d is forced radially outwardly by the shaft end, the opposite latch end 30c is forced radially inwardly due to the pivotal action of the latch about the fulcrum 34. This causes both ends of the latch flat surface 30a to be urged into firm contact with the shaft flat surface 16 so that the hub is held tightly in position. It is important to note that since the latch 30 extends throughout the axial length of the hub, a tight connection is maintained thereby preventing tilting or wobbling of the hub on the shaft.

The engagement of latch surface 30a with shaft surface 16 transmits a certain amount of torque between the shaft and the hub and also prevents rotary looseness between the components. However, for high torque applications, it is desirable that additional torque transmitting means be provided. For this purpose, the hub bore 32 has been formed with two inwardly extending shoulders 38 and 40, as seen in FIG. 6. These shoulders are positioned to engage the edges of shaft flat surface 16 to satisfactorily transmit torque between the two components in either direction. It should be realized, however, in view of desirable manufacturing tolerances, the shaft end may not be tightly positioned by the shoulders 38 and 40 and that this function is provided by the latch 30 as heretofore described.

From FIG. 6 it can also be seen that only the portion of the bore which will engage the shaft exterior surface need conform to such surface. The remaining portion of the bore may be given the configuration desired to obtain proper strength characteristics and ease of molding.

The embodiment of the invention described in FIGS. 10–13 is basically similar to that of the embodiment in FIGS. 6–9 with the major difference being that there is provided a fulcrum strut or connecting section 42 extending between the latch 30 and hub bore 32 which is not radially aligned as is the fulcrum 34 in FIGS. 6–9. Instead, the fulcrum strut 42 as best seen in FIGS. 11 and 13 slopes at an angle from the hub bore toward the latch end 30d, or in other words, toward the lock portion 36 or the end of the latch normally positioned adjacent the end of the shaft to be received within the bore. More specifically, the fulcrum strut 42 forms acute angles 44 and 45 with the wall of bore 32 extending toward the shaft end and with the outer flat surface 30b of latch end 30c. It has been found that an angle of about 45° is preferable. Strut 42 naturally forms complementary obtuse angles 46 and 47 with the wall of bore 32 extending away from the shaft end and with surface 30b of latch end 30d. The strut relationship might also be expressed by stating that the end of the hub adjacent the shaft end is closer to the end of the strut attached to the latch than it is to the end of the strut attached to the hub bore.

The purpose for the angled strut arrangement is to minimize the possibility of inadvertent removal of the hub from the shaft by an axial withdrawal force on the hub. Referring to FIG. 13, it will be appreciated that if a force is applied to the hub in an axial direction to withdraw the hub from the shaft, lock portion 36 in groove 18 prevents removal and strut 42 in effect tries to become radially aligned. This action uniquely causes the latch 30 and its lock portion 36 to become more tightly engaged with the shaft whereby inadvertent removal is made more difficult. The latch of FIGS. 10–13 naturally also provide the other advantages previously described in connection with the latch of FIGS. 6–9.

One additional slight difference between the embodiment of FIGS. 10–13 and that of FIGS. 6–9, as perhaps best seen in FIG. 10, is that the distance from the latch upper flat surface 30b to the outwardly adjacent wall of bore 32 is slightly greater than the corresponding distance shown in FIG. 6. This additional space is merely provided to accommodate the angled fulcrum strut 42. Naturally these dimensions may be varied to suit the particular application.

Referring now to a final embodiment of this invention illustrated in FIGS. 14–16, there is shown a molded hub 50 having a bore 52 adapted to receive a shaft 54. The end of the hub to be positioned adjacent the end of the shaft is provided with a pair of diametrically opposed latch members 56 and 58 each having one end 56c and 58c formed integrally with the walls of bore 52. The opposite ends 56d and 58d of the latches are free to flex radially; and in accordance with the invention, the latches are molded so that in an unrestrained position, as shown in FIG. 15, the free ends 56d and 58d of the latches extend radially inwardly into the interior of the bore.

To accommodate radially outward movement of the latches 56 and 58, the hub 50 has been formed with a pair of enlarged arcuate recesses 60 and 62. As can be seen recess 62 is positioned radially outwardly from latch 56 and recess 62 is positioned radially outwardly from latch 58. The radially outer surfaces of the latches are arcuate, as best seen in FIG. 14 to cooperate with the recesses 60 and 62.

As shown in FIG. 16, shaft 54 is provided with a pair of grooves 68 and 70 formed on opposite sides of the end of the shaft. Having rectangular cross sections with flat inner surfaces 68a and 70a, the grooves extend in a direction substantially perpendicular to the shaft axis. The latches 56 and 58 are formed with inwardly extending lock portions 64 and 66 to mate with the grooves 68 and 70. It will be understood that when the shaft 54 is inserted within the hub 50, the end of the shaft engages the sloping cam surfaces 64b and 66b of the lock portions causing the latches to be smoothly moved radially outwardly into the enlarged recesses 60 and 62. When the lock portions are aligned with the grooves 68 and 70, the latches snap radially inwardly causing the lock portions 64 and 66 to snap into the respective grooves. As can be seen, the flat surfaces 64a and 66a of the lock portions cooperate with the flat surfaces 68a and 70a of the grooves respectively. Also, surface 66c of lock portion 66 engages surface 70c of groove 70. In this manner the lock portions 64 and 66 are firmly engaged with the grooves in the shaft to prevent removal of the hub from the shaft by axially directed forces.

The arrangement of FIGS. 14–16 is primarily suitable for low torque applications in that while the latches 56 and 58 transmit torque, the hub can be removed from the shaft by holding the shaft and forcibly rotating the hub. When such force is applied, the lock portions 64 and 66 will slide arcuately out of the grooves 68 and 70. Such removal operation is very simple if a portion of the shaft is exposed for gripping purposes. In the event the shaft is not accessible the hub may be removed in the same fashion as the previous embodiment of the invention; namely, by prying the ends of the latches radially outwardly away from the shaft to lift the lock portions out of the shaft grooves and then subsequently applying an axial force to withdraw the hub from the shaft.

If it is desirable to use the embodiment of FIGS. 14–16 for higher torque applications, additional torque transmitting means can be easily incorporated into the arrangement. For example, the grooves 68 and 70 may be formed more into the shape of sockets rather than grooves having a flat surface forming a chord of the shaft. With such an arrangement it is very difficult to rotate the hub relative to the shaft, so that the lock portions can not be removed from their mating recesses in this fashion.

It should be noted that the latch members 56 and 58 do not extend throughout the axial length of the bore 52 but that instead they extend only about half the axial distance. Nevertheless, it should be realized that they may extend considerably further toward the opposite end of the hub if desired, so long as there is sufficient material to connect the latch to the hub.

The coupling arrangement of this invention including the unique molded hub and self-biased latches are very advantageous in that additional parts such as setscrews or keys and the necessary assembly tools are not required. Also, the hole tapping operation needed with setscrews and adding of adhesive or other means for locking are eliminated. Another method of attaching a plastic hub to a shaft is by knurling the shaft surface and forcing the hub onto the shaft. While this method does not require additional parts, the assembly procedure is more difficult than with the one step operation required of the present invention. Moreover, with the present invention, the assembly operation does not affect the balance of the hub and shaft whereas the forcing method may. The disassembly step of the couplings of the invention is also very simple and easy.

While there has been described several different embodiments of the invention, other variations and modifications may now become apparent to one skilled in the art. Accordingly, it is intended that the attached claims should include all such variations and modifications which fall within the true spirit and scope of the invention.

What is claimed is:

1. A hub and shaft coupling comprising a shaft of circular cross section having a recess on one end of the shaft leaving a flat exterior surface formed on one side of the shaft end, a molded hub having a bore for receiving said flat shaft end, a flat elongated flexible latch axially extending within said hub bore, a part of one elongated edge adjacent one end of said latch integrally connected with an internal wall of said hub bore and having its opposite end and opposite elongated edge spaced from the bore free to flex within the bore, said latch being adapted to fit within the area defined by said shaft recess such that the flat surface of the latch engages said shaft flat surface and such that one edge of the shaft flat surface engages said integral latch connection to transmit torque between the shaft and the hub, said latch being self-biased to a position wherein said flat surfaces are tightly urged into engagement along the axial length of the bore and also transverse to the axis of the bore, a groove formed in said shaft flat surface, and a radially extending lock portion formed integrally on a movable portion of said latch and adapted to fit within said shaft groove to resist axial movement between the hub and shaft.

2. A hub and shaft coupling comprising a shaft of circular cross section having a recess on one end of the shaft leaving a flat exterior surface formed on one side of the shaft end, a molded hub having a bore for receiving said shaft end, an elongated flexible latch having part of the side adjacent one end integrally formed with an internal wall of said hub bore along a part of the axial length of said bore and having its opposite end and opposite side spaced from the bore free to flex within the bore, said latch being adapted to fit within the area defined by said shaft recess, said latch being positioned within said hub such that a flat surface of the latch is adapted to engage said shaft flat surface and such that one edge of the shaft flat surface engages the portion of said hub connecting the latch to the wall of said bore to transmit torque between the shaft and hub, said latch being self-biased to a position wherein said flat surfaces are urged into engagement both along the axial length of the bore and also transverse to the bore axis, a groove formed in said shaft flat surface and extending transversely to the shaft axis, and a radially extending rib-like lock portion formed integrally on the free end of said latch and adapted to fit within said shaft groove to resist movement between said hub and said shaft.

References Cited
UNITED STATES PATENTS

| | | | |
|---|---|---|---|
| 2,189,845 | 2/1940 | Terrill | 287—53 |
| 2,269,208 | 1/1942 | Kimball | 287—53 |
| 2,668,973 | 2/1954 | Glaza et al. | 15—176 |
| 2,733,083 | 1/1956 | Strange | 287—53 |
| 3,084,852 | 4/1963 | Seavey | 230—246 |
| 3,187,521 | 6/1965 | Morris et al. | 287—119 |
| 3,193,312 | 7/1965 | Ehner | 292—349 |
| 3,256,031 | 6/1966 | Fillweber | 287—119 |

EDWARD C. ALLEN, *Primary Examiner.*

A. V. KUNDRAT, *Assistant Examiner.*